United States Patent Office 3,353,725
Patented Nov. 21, 1967

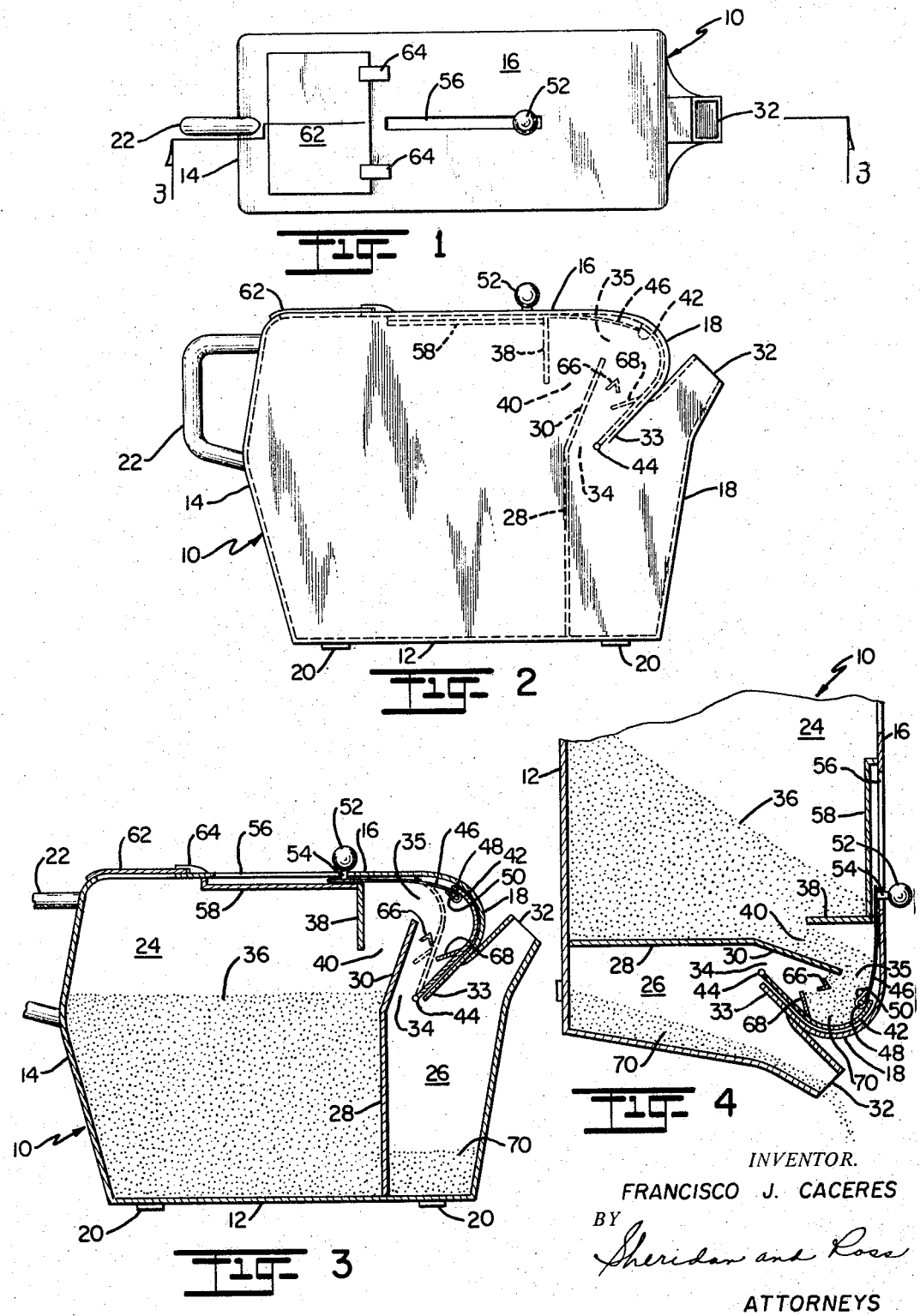

3,353,725
MEASURING AND DISPENSING UNIT
Francisco J. Caceres, 2931 S. Adams St.,
Denver Colo. 80205
Filed Sept. 22, 1966, Ser. No. 581,318
13 Claims. (Cl. 222—456)

This invention relates to a measuring and dispensing container for granular or powdered material; more particularly, it relates to such a device in which a required amount of material is measured in a measuring compartment simultaneously with the dispensing of a previously measured amount from the container.

In its broadest sense, the measuring and dispensing unit of the invention is a container constructed to receive granular material from other cartons, boxes, etc. in which the granular material is sold, and to measure and dispense required amounts of the material as needed.

Prior art measuring and dispensing devices of the type to which the unit of this invention relates have not been entirely satisfactory for a number of reasons. For example, accurate and consistent measurement of required amounts of material was not possible with them. There are many situations in which the housewife is involved, such as, cooking, washing, etc. in which it is desirable and often essential to have available a device for dispensing accurate amounts of granular material. In prior art devices designed to dispense measured amounts of material, the measurements would be in error as the amount of material in the dispenser varied or the speed of tilting the dispenser varied, and because the tilting operation to dispense the material often resulted in varying amounts of material flowing into the measuring compartment.

A further disadvantage of prior devices is the fact that they provide no means for adjusting the amount of material measured. There are situations in which it is necessary to dispense a certain amount of material for one operation and a different amount of material for a succeeding operation.

Accordingly, it is an object of this invention to provide a measuring and dispensing unit for granular material with which accurate and reproducible measurements of material to be dispensed can be made regardless of the amount of material in the unit or the speed with which it is tilted to dispense the material. It is another object of this invention to provide a measuring and dispensing unit in which the measured amount to be dispensed can be adjusted as required for various applications.

It is a further object of this invention to provide a measuring and dispensing unit which is simple in operation and construction so that it can be manufactured by simple manufacturing techniques.

The measuring and dispensing unit of the invention comprises a container having a pouring spout at its forward end and divided by a partition into a storage compartment for granular material and a measuring compartment with which the spout communicates. A channel for the passage of granular material from the storage compartment to the measuring compartment is formed between the upper section of the partition and the upper forward wall of the container from which a lip extends inwardly. A shield located forwardly of the partition is mounted to the top of the container to extend vertically therefrom and forms with the upper section of the partition an entrance channel for the passageway so that material entering the passageway must pass through the entrance channel. A valving or metering element is pivotally mounted by a pivot point in or adjacent to the passageway so that it can be moved lengthwise of the container for adjusting the width of the passageway and thereby the amount of measured material. In order to insure that reproducibly accurate amounts of material are measured into the measuring compartment, flow restricting means are located in the passageway consisting of a wedge-shaped element mounted transversely of the passageway and adjacent to the partition, and a plate mounted on the rear side of the metering element at an angle and extending transversely of the container.

The invention will now be described with reference to the accompanying drawing hereby made a part of this specification and in which:

FIGURE 1 is a top plan view of the measuring unit;
FIGURE 2 is a side elevational view of the measuring unit;
FIGURE 3 is a vertical cross section taken on the line 3—3 of FIGURE 1 and showing granular material in the container; and
FIGURE 4 is a fragmentary cross-sectional view of the container showing it tilted 90° forwardly to the pouring position.

Referring now to FIGURES 1–3, the unit comprises container 10 of any desired configuration and in this modification constructed with a bottom 12, a rear wall 14, a top 16 and a front wall 18. The unit shown is of rectangular configuration; however, it may take other forms. It may be made of plastic, light metal or other suitable material. The preferred material is plastic because of the ease with which plastic sections can be secured together in manufacturing the device. The unit 10 may be provided with leg elements 20 and a handle 22 for convenience in lifting the device and dispensing material therefrom.

The unit 10 is divided into a supply compartment 24 and a charge compartment 26 by partition 28. The partition 28 is mounted to the bottom 12 to extend upwardly therefrom and is provided with a forwardly angled top section 30 ending short of the top 16 of the container.

For dispensing or pouring granular material from the unit, a spout 32 is constructed in the forward wall of the unit to communicate with charge compartment 26. The upper section of the forward wall 18 is provided with an inwardly extending lip 33 which forms one entrance wall of the spout. It will be seen from the described construction that a passageway 34 for granular material from storage compartment 24 passing through the measuring area to charge compartment 26 is formed between the upper section 30 of the partition, the lip 33 and forward wall 18.

For shielding the entrance 35 to passageway 34 from direct flow of granular material 36, a downwardly extending shield 38 extends from the top 16 and transversely of the container. The end of shield 38 extends below the upper end of top section 30 so that an entrance channel 40 is formed between the shield 38 and top section 30. The shield 38 insures that the entrance 35 to the measuring area and passageway 34 is never subjected to direct flow of granular material 36, but the material must always flow through entrance channel 40 before entering the entrance of passageway 34. This feature insures that the same amount of material will flow through entrance channel 40 and into passageway 34 regardless of the amount of material in supply compartment 24. If it were not for the shield, the entrance to passageway 34 would be subjected to a flow of different amounts of material depending upon how high the level of material in the storage compartment extends. This would result in non-uniform amounts of material being measured for the same valve setting.

For the purpose of measuring different amounts of material to be dispensed, an adjustable metering or valving element 42 is pivotally mounted by its end at pivot point 44 to move lengthwise of the container and thereby vary the width of passageway 34 and the remainder of the measuring space thereabove. The extreme rearward position of the metering element 42 is shown by dotted lines. For moving the metering element 42 lengthwise of the container, a link 46 is attached to the upper end of the metering element by means of an anchor pin 48 on the metering element and an eyelet 50 on the end of the link 46, and the link 46 is made operative by means of an adjustment knob 52 connected to it by means of stud 54 which moves back and forth in guide slot 56 in the top of container 10. Other equivalent means may, of course, be used for moving the valving element 42 lengthwise of the container. It will be seen that the width of passageway 34 and the remainder of the measuring space above it, and therefore, the amount of material to be measured for any one charge, can be varied by moving metering element 42 backwards and forwards. A rectangular enclosure 58 with an open front end is mounted on the bottom side of top 16 below slot 56 to serve as a guide for link element 46 in its movement backward and forward when the width of passageway 34 is being adjusted, and also to prevent leakage of material from the storage compartment 24 through slot 56. An access door 62 is mounted by hinges 64 to permit access to storage compartment 24 for introduction of granular material into the compartment 10.

In order to insure a uniform measurement for a particular setting of the valve element, flow restricter wedge 66 is mounted in passageway 34 adjacent partition 28 to extend transversely of the passageway, and flow restricter plate 68 is mounted at an angle on the rear side of metering element to extend transversely of the passageway.

It is to be noted that pivot point 44 for valving element 42 is located substantially on a vertical plane extending through the end of top section 30. This pivot point is preferably located on the vertical plane referred to; however, it may be located between the vertical plane and the partition 28. Reference to the pivot point as being located between the said vertical plane and the partition includes location of the pivot point on the plane. The location of the pivot point in the area described insures against flooding of the passageway 34 with an excess of material to result in non-uniform amounts of material being measured for a given setting of metering element 42.

The operation of the device will now be described by reference to FIGURE 4. Assuming that granular material has been loaded into the storage compartment 24 and the device is ready for the dispensing of the first charge of granular material which may be washing powder, sugar, salt, etc., the first step is to measure a charge into the measuring area to be delivered to the charge compartment 26 and then dispensed through the spout 32. The unit is tilted forwardly at least 90° to the position shown in FIGURE 4. In this operation all material reaching the entrance 35 of passageway 34 must pass through entrance channel 40. It will be noted that the shield 38 prevents an excess of material from entering the entrance 35 to passageway 34, thus insuring that regardless of the speed with which the container is tipped forwardly the entrance to passageway 34 will not be flooded with granular material to result in non-uniform amounts being measured with the same setting of metering element 42, irrespective of how full the storage compartment 24 is. In the forwardly tilted position of the unit as shown in FIGURE 4, the granular material will be held in the measuring area by flow restricter wedge 66 and flow restricter plate 68 so that a uniform amount of material will always be trapped between the flow restricters 66 and 68, the inside surface of valving element 42 and a line extending from the top of top section 30 to the top 16 of the container. The next step is to tilt the container back to its original position, this action resulting in the measured amount of material or charge 70 dropping down into the bottom of the charge compartment 26 as shown in FIGURE 3.

The next step is to again tilt the unit 10 forwardly to dispense the measured amount or charge 70 from the charge compartment. It will be noted that each time the unit is tilted forwardly the charge measured by the preceding tilting will drop into the charge compartment and another charge will be simultaneously measured. If the same charge is required each time, there is no need to change the setting of valving element 42; however, if a different size charge is required it is only necessary to change the setting of the valving element 42. A scale can be marked along the guide slot 56 to indicate the position of knob 52 for different settings of the metering element 42. A corresponding scale can be marked along the front side of spout 32 to indicate the size of the charge.

Upon extensive testing of the device, it was found that for a given setting of valve element 42 uniform measurements always result. The accuracy of the measurement results from the cooperation of the shield 38, the flow restricter wedge 66 and the flow restricter plate 68 to insure that a uniform amount of material is always measured for a given setting. Shield 38 insures against flooding of the entrance 35 to channel 34, and the flow restricters 66 and 68 operate to block the flow of measured material 70 through channel 34 when the container is tilted forwardly as shown in FIGURE 4, but when the container is then tilted back to its upright position, the measured charge of material can flow past the restricters 66 and 68 into the charge compartment 26 for dispensing therefrom through the spout 32 on the next forward tilting of the unit.

Although the invention has been described with a certain degree of particularity, it is understood that the present disclosure has been made only by way of example and that numerous changes in the details of construction may be resorted to without departing from the spirit and scope of the invention as hereinafter claimed.

What is claimed is:

1. A measuring and dispensing unit comprising: a container; a partition dividing said container into a storage compartment and a charge compartment; a spout at one end of said container in communication with said charge compartment; a passageway for granular material between said charge compartment and said storage compartment; a measuring area including at least a part of said passageway; and adjusting means for adjusting the width of said passageway to thereby adjust the amount of material measured and entering said charge compartment as said unit is tilted in the direction of said spout to dispense material therefrom.

2. The unit of claim 1 in which said adjusting means is a metering or valving element pivoted at one end to a pivot point to pivot to adjust the width of said passageway.

3. The unit of claim 2 including shielding means in front of the entrance to said measuring area to prevent direct flow of granular material therein.

4. The unit of claim 3 in which said shielding means forms with said partition an entry channel for said measuring area.

5. The unit of claim 2 including flow restricting means in said passageway.

6. The unit of claim 5 in which said flow restricting means comprises a wedge-shaped element mounted transversely in said channel adjacent said partition and a plate mounted at an angle on the side of said metering element facing said passageway.

7. The unit of claim 5 in which said shielding means forms with said partition an entry channel for said measuring area.

8. The device of claim 2 in which the upper section of said partition is angled forwardly and said pivot point is located at a point between said partition and a vertical plane passing through the upper end of said upper section.

9. A measuring and dispensing unit comprising: a container having a bottom and a top; a partition inside said container extending from said bottom to a point short of said top having a forwardly extending top section and dividing said container into a supply and a charge compartment; a spout on the forward end of said container communicating with said charge compartment; a lip extending from the forward wall of said container internally thereof forming with said partition a passageway between said storage and charge compartments; a measuring area including at least a part of said passageway; and a pivoted valving element mounted on a pivot point adjacent said passageway to pivot to adjust the width of said passageway and movable lengthwise of said container.

10. The unit of claim 9 including a shield extending vertically from said top to a point below the end of said top section and forming with said top section an entrance channel to said measuring area.

11. The unit of claim 10 including flow restricting means mounted in said channel.

12. The unit of claim 11 in which said flow restricting means comprises a wedge-shaped element mounted transversely in said channel adjacent said partition and a plate mounted at an angle on the side of said valving element facing said passageway.

13. The unit of claim 10 in which said pivot point is located between said partition and a vertical plane passing through the end of said top section.

References Cited
UNITED STATES PATENTS

| | | | |
|---|---|---|---|
| 1,727,227 | 9/1929 | Brierley | 222—455 |
| 3,140,698 | 7/1964 | Kaunzner | 222—454 X |
| 3,185,357 | 5/1965 | Merkel | 222—455 X |

ROBERT B. REEVES, *Primary Examiner.*

N. L. STACK, *Assistant Examiner.*